United States Patent [19]

Retzlaff

[11] 4,365,545
[45] Dec. 28, 1982

[54] APPARATUS FOR MAKING LARGE SIZED BLOCKS OF CHEESE

[75] Inventor: Wilfred F. Retzlaff, New Franken, Wis.

[73] Assignee: L. D. Schreiber Cheese Co., Inc., Green Bay, Wis.

[21] Appl. No.: 249,090

[22] Filed: Mar. 30, 1981

Related U.S. Application Data

[62] Division of Ser. No. 30,119, Apr. 16, 1979, Pat. No. 4,291,064.

[51] Int. Cl.³ ................. A01J 25/11; A01J 25/13; A01J 25/15
[52] U.S. Cl. .......................... 99/459; 99/465
[58] Field of Search ................. 99/456–459, 99/460, 465; 100/104, 107, 110, 116, 108, 109; 210/514, 515, 518; 425/84, 85; 53/122, 438, 527; 426/397, 411, 414, 478, 491, 512, 515

[56] References Cited

U.S. PATENT DOCUMENTS

| | | | |
|---|---|---|---|
| 3,969,995 | 7/1976 | Krueger et al. | 99/458 |
| 4,263,330 | 4/1981 | Streeter et al. | 99/458 |
| 4,289,793 | 9/1981 | Gustafson et al. | 99/458 |

Primary Examiner—Philip R. Coe
Assistant Examiner—Timothy F. Simone
Attorney, Agent, or Firm—Dressler, Goldsmith, Shore, Sutker & Milnamow, Ltd.

[57] ABSTRACT

An apparatus for pressing and draining whey from cheese curd. In particular, this apparatus and method are made suitable for producing large blocks of cheese. A container mold having an internal drain screen is filled with cheese curd particles. Pressure is then applied to the cheese curd draining whey into the drain screen and out of the container mold. The container mold is then inverted and the internal drain screen is removed and another application of pressure is used to close any remaining voids within the cheese curd. The container mold is then sealed and prepared for shipping.

23 Claims, 14 Drawing Figures

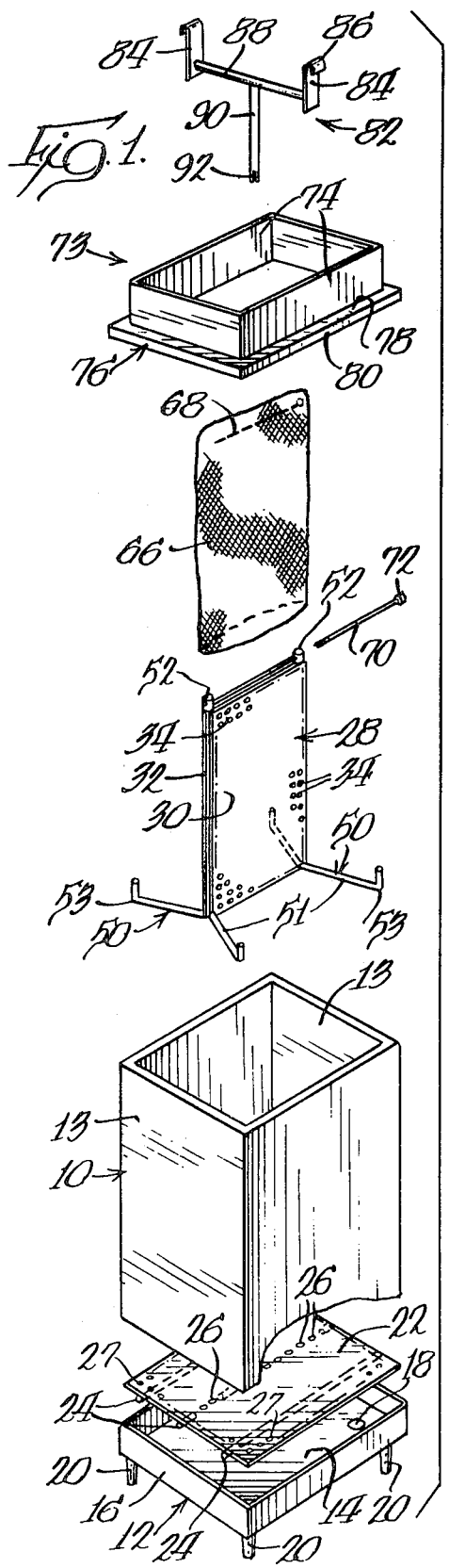
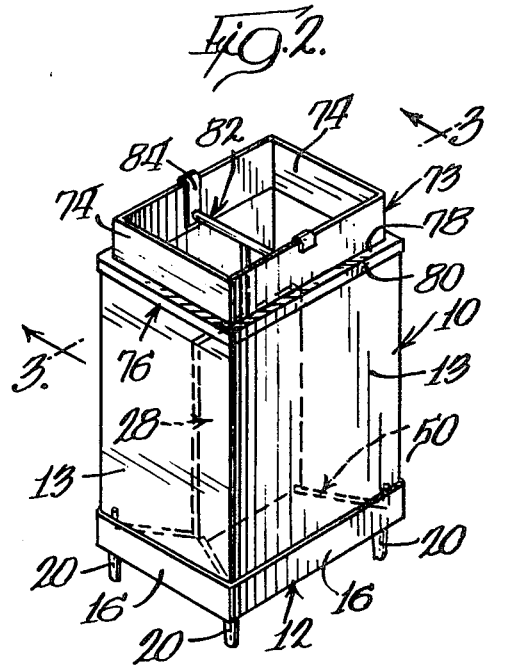
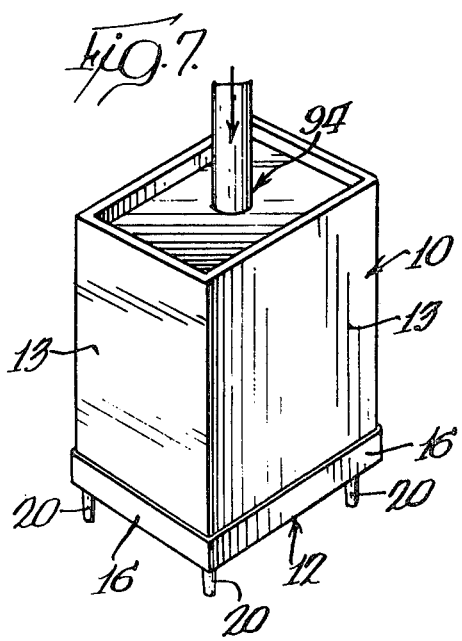

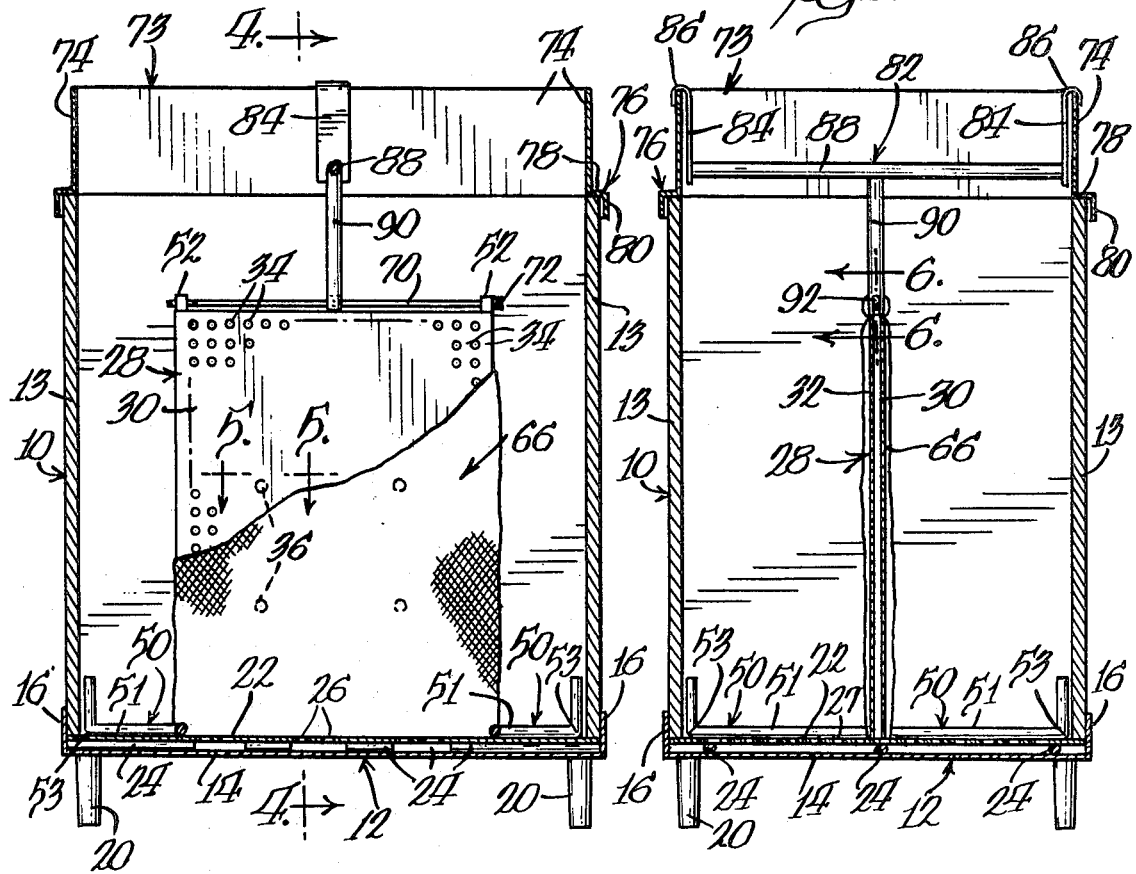

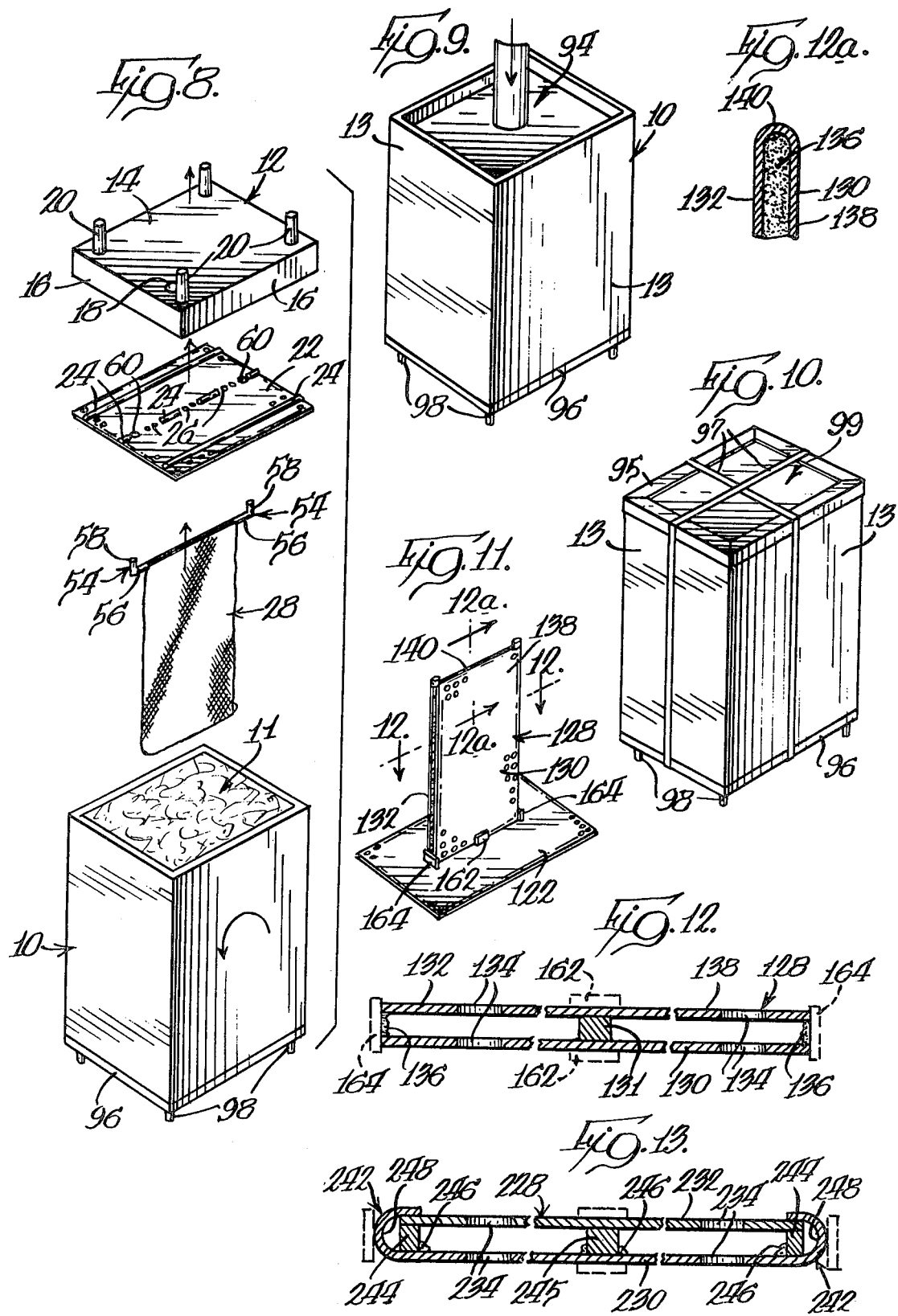

APPARATUS FOR MAKING LARGE SIZED BLOCKS OF CHEESE

This is a division, of application Ser. No. 030,119, filed Apr. 16, 1979, U.S. Pat. No. 4,291,064.

TECHNICAL FIELD

This invention relates generally to the manufacture of cheese, and particularly to the apparatus and method for production of large blocks of natural cheese.

In the process of making natural cheese, initially, a curd must be formed by adding a curdling agent (e.g., rennet) to a body of ripened milk, cutting the coagulant and then cooking the resulting curd. This curd is then stirred and some whey is drained from the vat. Depending on the type of natural cheese desired, the curd under goes a variety of treatments which includes a salting. The salting promotes an expulsion of additional whey from the curd. This additional whey must be removed to prevent an adverse affect on the quality of the cheese. An essential step in manufacturing a large block of cheese which will be substantially homogeneously solid involves placing this partially drained curd into a mold and applying pressure to drain this additional quantity of whey from the curd. After the block of cheese is obtained, various applications of temperature and hold times are utilized to develop desired textures, aromas and flavors.

Large cheese blocks may weigh approximately 700 pounds, as disclosed in U.S. Pat. No. 3,355,805, and they can be easily divided into various consumer sizes and packaged. These large unit size cheese blocks have become desirable in the cheese making industry because economic savings can be accrued in a mass production context.

A critical aspect in manufacturing large blocks of cheese is that moisture content must be reasonably uniform throughout the block. If the draining of the whey from the curd particles during the application of pressure to the curd is not substantial and uniform, local soft curd masses develop within the large block, thereby creating an undesirable result of waste in manufacturing.

BACKGROUND ART

U.S. Pat. No. 3,355,805 discloses an apparatus to manufacture large blocks of cheese. This apparatus does not provide for any draining mechanism to be located within the cheese curd material during the application of pressure. As a result, three applications of large amounts of pressure are needed to drain substantial quantities of whey from the curd particles. Further, the apparatus has to be tilted to allow the draining whey to flow away from the container holding the cheese curd.

U.S. Pat. Nos. 3,969,995 and 4,049,838 disclose an apparatus and method by which to manufacture large blocks of cheese. These patents call for two sets of draining mechanisms to be inserted within the curd material. One set each of said draining mechanisms are to pierce the curd material from the top and bottom ends of a container mold. Said draining mechanisms are of V-shaped perforated blade construction that do not extend beyond the mid-portion of the container when fully penetrating the curd material. Furthermore, the entire cheese manufacturing apparatus has to be rotated 90° from its original upright orientation to permit the whey to flow from these draining mechanisms and out of the curd container.

Other typical apparatus for manufacturing large blocks of cheese are listed in other U.S. Pat. Nos. 2,851,776; 3,100,712; 3,133,492; 3,568,316 and 3,719,994.

DISCLOSURE OF INVENTION

In accordance with the present invention, a drain screen is provided for receiving draining whey from the cheese curd material consisting of two narrowly spaced, parallel, perforated sidewalls. This apparatus is centrally placed in a container for holding the cheese curd, on a drain plate at the bottom of the container and is erect throughout the entire vertical cross section of the container.

The drain screen apparatus being immersed in the cheese curd particles, provides a more accessible outlet for the whey to drain out the container when pressure is applied to the curd, in comparison to devices such as U.S. Pat. No. 3,355,805 which do not have such an internal draining mechanism. With such an improved device, the whey need not travel as far to escape the presence of the curd. Therefore, less pressure is required to be exerted on the whey to obtain desirable results than in aforesaid prior art. As a result, in the present invention there is no need for apparatus to develop large forces and the container need not be made of extraordinary construction to withstand high pressure levels.

The improved drain screen possesses the advantage of being negligibly obtrusive while immersed in the curd material because of its narrowly spaced, parallel, sidewall construction compared to the prior art V-shaped blades utilized in U.S. Pat. Nos. 3,969,995 and 4,049,838. As a result of this improvement, the potential for wasteful voids remaining in a completed cheese block are diminished. Voids in a large cheese block are undesirable because they reduce the utility of the entire large block when it is sliced into smaller sizes. Furthermore, since the drain screen is located centrally in the container and is of parallel construction throughout the entire cross section of the container, it provides a more uniform distribution of the drain screen within the container than a V-shaped blade arrangement of the prior art. Thus, the curd is more evenly drained resulting in the cheese having a smaller deviation of moisture content throughout the entire cheese block, thereby producing a more predictable and useful product. In addition, the improved method has a distinct advantage of not requiring the container mold to rotate before applying pressure to the cheese curd particles to facilitate draining the whey from the container as required in U.S. Pat. No. 4,049,858. The present invention permits the whey to drain out through the bottom of the container mold while the container mold is in an upright position during the first application of pressure.

BRIEF DESCRIPTION OF THE DRAWINGS

The drawings illustrate the best mode presently contemplated of carrying out the invention.

In the drawings:

FIG. 1 is an exploded perspective view, partly broken away, of the container to receive and hold the cheese curd and the remaining apparatus necessary to fully assemble the cheese making container;

FIG. 2 is a perspective view of the apparatus shown in FIG. 1, as assembled;

FIG. 3 is a sectional view taken substantially through a plane indicated by section line 3—3 in FIG. 2;

FIG. 4 is a sectional view taken substantially through a plane indicated by section line 4—4 in FIG. 3;

FIG. 5 is a sectional view taken substantially through a plane indicated by section line 5—5 in FIG. 3;

FIG. 6 is an enlarged, fragmentary sectional view taken substantially through a plane indicated by section line 6—6 in FIG. 4;

FIG. 7 is a perspective view of a press frame exerting pressure on the cheese curd through the top open end of the container after removal of a portion of the apparatus in accordance with the present invention;

FIG. 8 is an exploded perspective view of the cheese curd filled container inverted and the apparatus extracted from the curd from what is now the top of the container and including an alternative embodiment of means for supporting and centering the drain screen;

FIG. 9 is a perspective view of the press frame exerting pressure on the cheese curd held in the inverted container of FIG. 8;

FIG. 10 is a perspective view of a sealed container after the press frame in FIG. 9 has been removed;

FIG. 11 is a perspective view of a preferred form of a drain screen;

FIG. 12 is a sectional view taken substantially through a plane indicated by section line 12—12 in FIG. 11, showing an alternative embodiment of the drain screen and means for supporting and centering the drain screen;

FIG. 12a is a partial sectional view taken through a plane indicated by section line 12a—12a of FIG. 11, showing a partial vertical cross-sectional view of the alternative construction of the drain screen shown in FIG. 12; and FIG. 13 is a similar view as taken in FIG. 12 showing an alternative embodiment of the drain screen.

BEST MODE FOR CARRYING OUT THE INVENTION

Introduction

While this invention is susceptible of embodiment in many different forms, there are shown in the drawings and will herein be described in detail preferred embodiments of the invention. It should be understood, however, that the present disclosure is to be considered as an exemplification of the principles of the invention and is not intended to limit the invention to the embodiments illustrated.

The precise shapes and sizes of the components herein described are not essential to the invention unless otherwise indicated, since the invention is described with reference to an embodiment which is simple and straightforward.

In the following description, two digit numerals are used to refer to the preferred embodiment of drain screen with two types of means for supporting and centering the drain screen as illustrated in FIGS. 1-10; three digit numerals in the one hundred series are used to refer to the alternative embodiment of the drain screen as illustrated in FIG. 11, FIG. 12, and FIG. 12a, and a further alternative embodiment of the means for supporting and centering the drain screen as illustrated in FIG. 11 and FIG. 12; and three digit numerals in the two hundred series are used to refer to an alternative embodiment of the drain screen as illustrated in FIG. 13; the same last two digits in each numeral designate similar or functionally analogous elements in the various embodiments.

The apparatus of this invention has certain conventional mechanisms, the details of which, though not fully illustrated or described, will be apparent to those having skill in the art and an understanding of the necessary functions of such mechanisms.

The choice of materials is dependent upon the particular application involved and other variables, as those skilled in the art will appreciate.

Apparatus for Making Large Sized Blocks of Cheese

The drawings illustrate an apparatus for pressing and draining whey from cheese curd particles in making large homogeneously solid blocks of cheese which comprises in general, an open ended container 10 to hold the cheese curd particles 11 and is supported on a base receptacle 12.

It should be understood that whey may include other constituent fluids, such as water which is added to cheese curd in the production of particular natural cheeses. Hereinafter, any reference to whey can include such other constituent fluids.

The container 10 is generally rectangular in cross section and is normally fabricated from plywood and contains a flexible plastic liner to receive the cheese curd.

The base receptacle 12 is composed of a generally flat plate 14 with wall members 16 rising from each edge of plate 14 forming a box with its top end open so as to receive draining whey from the container 10. The flat plate 14 with its corresponding wall members 16 are of such configuration and dimensions so as to enable the container 10 to be snugly received within the base receptacle 12 as clearly shown in FIG. 3 and FIG. 4. The flat plate 14 in the base receptacle 12 has an opening 18 which, with the aid of the legs 20, which are attached to the flat plate 14 and which keep the flat plate 14 separated from the floor, permits the whey that collects in the base receptacle 12 to drain freely.

The container 10, when located in the base receptacle 12, rests on a receiver means or drain plate 22. The drain plate 22 is of generally flat construction with a configuration that conforms to the interior dimensions of the base receptacle 12 allowing the container 10 to rest on the drain plate 22 when the container 10 is placed in the base receptacle 12 as clearly illustrated in FIGS. 3 and 4. Generally, the drain plate 22 is of stainless steel composition in order to prevent buckling when the container is full of cheese curd particles and pressure is applied to the curd. Metal rods 24 are welded to the bottom of the drain plate 22 in order to keep the drain plate 22 separated from the flat plate 14 of the base receptacle 16 and thereby maintain the row of plurality of apertures 26, which are positioned on a major central axis of the drain plate 12, and a plurality of additional openings 27 located on opposite sides of row of plurality of apertures 26 unobstructed and allow whey draining from the container 10 to freely enter the base receptacle 12.

The drain device means or drain screen 28 of the present invention is the apparatus which receives draining whey from the cheese curd material while located within the container 10. Such drain screen or conduit means 28 is generally comprised of two parallel perforated sidewalls 30 and 32 (FIG. 5) formed of a suitable material, such as stainless steel. The drain screen 28 is rectangular in shape having a width which is somewhat less than coextensive with the dimension between side walls 13 of the container 10 and is centered between said sidewalls 13, as illustrated in FIG. 3.

The present invention contemplates that the drain screen 28 may be of different construction, three different embodiments being illustrated in FIGS. 5, 12, and 13. In addition, this invention proposes three separate embodiments for means for supporting and centering said drain screen 28 as illustrated in FIG. 1, FIG. 8, and FIG. 12 which may be used interchangeably with any of the three contemplated embodiments of drain screen 28.

In FIG. 5, the drain screen 28 being the preferred embodiment, includes two parallel stainless steel sidewalls 30 and 32 which are fixed apart ⅛ inch by a plurality of disks 35 welded to one of the sidewalls. The sidewalls 30 and 32 of drain screen 28 have a plurality of apertures 34 preferably being about ⅜ inch in diameter and being uniformly distributed in vertical rows spaced about two inches apart on centers and in corresponding horizontal rows about two inches apart on centers as illustrated in FIG. 3. These apertures 34 are preferably right cylindrical bores. However, these apertures 34 may take on a variety of configurations for all embodiments of drain screen 28. The sides, and/or top, of sidewalls 30 and 32 may be welded to one another.

An alternative embodiment of drain screen 28 is illustrated in FIG. 11, FIG. 12 and FIG. 12a as drain screen 128. In FIG. 12a, the drain screen is comprised of a single stainless steel plate 138 having an intermediate bent portion 140 to produce two parallel sidewalls 130 and 132. These parallel sidewalls 130 and 132 are fixed apart ⅛ inch by welds 136 (FIG. 12) extending along the sides thereof and a middle spacing block 131 comprised of metallic disks, which may be snugly fitted or welded to either of said sidewalls 130 or 132 as illustrated in FIGS. 12 and 12a. Sidewalls 130 and 132 of drain screen 128 have a plurality of apertures 134 as illustrated in FIG. 12 being about ⅜ inch in diameter and being uniformly distributed in vertical rows spaced about two inches apart on centers and in corresponding horizontal rows about two inches apart on centers as similarly illustrated in the preferred embodiment of FIG. 3.

Another alternative embodiment of drain screen 28 is illustrated in FIG. 13 as drain screen 228. In FIG. 13, the drain screen 228 is comprised of two stainless steel sidewalls 230 and 232 which are fixed apart ⅛ inch by end spacing blocks 244 and middle spacing block 245 comprised of metallic disks, which may be affixed to the sidewall 230 by welds 246. Sidewall 230 has two opposing bent over side edges 242 thereby forming a U-shaped channel 248 allowing sidewall 232 to slide between end spacing blocks 244 and bent over edges 242 of sidewall 230. Sidewalls 230 and 232 of drain screen 228 having a plurality of apertures 234 as illustrated in FIG. 13 being about ⅜ inch in diameter and being uniformly distributed in vertical rows spaced about two inches apart on centers and in corresponding horizontal rows about two inches apart on centers as similarly illustrated in the preferred embodiment of FIG. 3.

Drain screen 28 is supported and centered in container 10 by means for supporting and centering which contemplates three different embodiments. The preferred embodiment being illustrated in FIG. 1 and alternative embodiments being illustrated in FIG. 8 and FIG. 12. In FIG. 1 the means for supporting and centering includes a plurality of legs 50 are defined by metal rods 51 which radiate out from the bottom portion of drain screen 28 and are attached by welding legs 50 to the bottom corner faces of sidewalls 30 and 32. Legs 50 are of L-shaped configuration with the longest portion being parallel to and in full contact with the drain plate 22 and resting on said drain plate 22 as illustrated in FIG. 3 and FIG. 4. The ends 53 of legs 50 when located in the container 10 are in contact with the corners of said container 10 as illustrated in FIG. 3 and FIG. 4, to provide for positioning of the drain screen 28 over the apertures 26 of the drain plate 22.

An alternative embodiment of said legs 50 are rod stabilizers 54 as illustrated in FIG. 8. Rod stabilizers 54 are comprised of metal rods 56 extending outwardly from the bottom side edges of the drain screen 28 and pin means 58 on free ends of rods 56. In the illustrated embodiment, there are two rods 56 with pin means 58, one each extending outwardly from one end wall of the drain screen 28. These rods 56 are generally parallel to and resting on drain plate 22 when the drain screen 28 is within the container 10. The pin means 58 on each of the rods 56 extend in a direction normal to its rod 56 and in a perpendicular direction to engage into apertures 60 located in the drain plate 22, the apertures being spaced outwardly from the drain screen 28 as illustrated in FIG. 8 when drain screen 28 is positioned in the container 10.

Another alternative embodiment of said legs 50 are two pairs of stabilizing tabs 162 and 164 as illustrated in FIG. 11. Tabs 162 and 164 are to be located on drain plate 122 facing the interior of container 10. The first pair of tabs 162 is positioned such that each tab embraces the outside surface of respective sidewalls 130 and 132 of drain screen 128, when the drain screen is placed over the row of apertures 26 of drain plate 122. The second pair of tabs 164 are positioned such that each tab embraces outside ends of the drain screen 128, when the drain screen is placed over the row of apertures 26 of the drain plate 122.

Any of the three alternative embodiments of the means for supporting and centering being legs 50, metal rods 56 with pin means 58 or tabs 162 and 164 can be utilized with any of the alternative embodiments of drain screen 28, 128, or 228. Also, if desired, a single tab 131 positioned to project into the space defined between plates 130 and 132 may be used to stabilize conduit means 128 in one direction.

A press drain cloth or envelope 66 (FIG. 3) made of a porous material, such as nylon, which may be optionally employed, allows whey to pass to the drain screen 28 when the drain cloth envelope 66 is covering the outermost surfaces of drain screen 28, as illustrated in FIG. 4. The drain cloth envelope 66 is covering the outermost surfaces of drain screen 28, as illustrated in FIG. 4. The drain cloth envelope 66 has a stitched, or otherwise suitably formed pocket 68 at the upper end thereof which receives positioning means or bar 70. The drain cloth envelope is held around the drain screen 28 by the bar 70 being mounted in vertical ears 52, which are defined by two short vertical rods welded to the top edge of sidewalls 30 and 32 of drain screen 28 and protrude a short distance out of the top of drain screen 28 as illustrated in FIG. 1. Bar 70 preferably has a threaded end portion 70a that is threadingly received in an aperture in the left-hand ear 52, as viewed in FIG. 6. The drain cloth envelope 66 then drapes over the drain screen 28 and is thereby secured to the drain screen 28. Bar 70 may be a metal rod ¼ inch in diameter having a solid metal cap or hand grip 72 which is about ⅝ inch in total diameter and ¼ inch in width to allow easy handling and threading of the bar 70 into the pocket 68 of the drain cloth envelope 66.

A filler ring 73 is comprised of four wall members 74 which form a collar conforming to the configuration of the interior of the container 10, as illustrated in FIG. 3 and FIG. 4. These wall members 74 have a right angled flange 76 which runs along the entire bottom end of the wall members 74. The upper leg 78 of the right angled flange 76 is of sufficient length that when filler ring 73 is resting on the container 10, the upper leg 78 extends beyond the exterior surfaces of the container 10 and permits the lower leg 80 of the right angle flange 76 to run parallel to the outside of container 10. The filler ring 73 is thereby held in place on top of the container 10 as illustrated in FIGS. 3 and 4.

The filler ring 73 prevents spillage of curd particles when filling container 10 and it also provides a hang support for a holding means or bracket 82 comprised of two metal strips 84 with bent over upper ends forming a hook portion 86, both hook portions 86 being received over a filler ring 73 wall member 74 that are opposite each other. These strips 84 are joined by a metal rod 88 which extends across the top open end of the container 10. In the mid-portion of the metal rod 88 a flat metal bar 90 hangs down into the container. The bottom end of the metal bar 90 comprises a two-pronged fork 92 which straddles the top portion of the drain screen 28 and holds the top portion of the drain screen 28 while the container 10 is being filled with cheese curd particles. Once sufficient curd particles can maintain the drain screen's vertical posture within the container 10 the bracket 82 is removed.

Method for Making Large Blocks of Cheese

The drawings illustrate a method for pressing and draining whey from cheese curd particles to make large substantially homogeneously solid blocks of cheese. It should be understood that whey may include other constituent fluids, such as water which is added to cheese curd in the production of particular natural cheeses.

In FIGS. 1, 3, and 4, the drain plate 22 is placed into the base receptacle 12. The bottom open end of the container 10 is enclosed by placing the container onto the drain plate 22 and at the same time into the base receptacle 12. Subsequently, the drain cloth envelope 66 is secured to the drain screen 28 and that assembly is then centrally placed into the container 10 to rest on drain plate 22 centered over apertures 26. The filler ring 73 is placed onto the upper end of the container 10 and the holding means or bracket 82 is hung onto the wall members 74 of the filler ring 73 and engages the drain screen 28 by the two pronged fork 92 of the holding means or bracket 82.

The completed assembled container 10 as shown in FIG. 2 is then filled with cheese curd particles. When sufficient curd is placed into the container to support the drain screen 28, the holding means or bracket 82 and the filler ring 73 are removed. The cheese curd is then allowed to settle and partially drain due to the weight of the cheese curd.

The cheese curd is now ready to be drained by applying pressure in FIG. 7 by utilizing a press frame assembly 94. Pressure is applied for approximately one-half hour. The press frame assembly 94 is then removed. A lid 96 (FIG. 10) comprised of a rectangular plate is secured to cover the top open end of the container 10. The lid 96 has four legs 98, each leg 98 protruding up from a corner of the upper surface of the lid 96.

The container 10 is then inverted and placed to rest on the legs 98 of the lid 96, as illustrated in FIG. 8. The base receptacle 12 and the drain plate 22 are then removed from what is now the upper open end of the container 10. The drain screen 28 is then carefully removed from the cheese curd particles 11 to prevent creating unnecessary voids within the cheese curd particles 11.

In FIG. 9 the press frame assembly 94 is again used to apply pressure on the cheese curd particles 11. This pressure application closes a substantial amount of residual voids created by the first pressure application in FIG. 7.

In FIG. 10 the press frame assembly 94 has been removed and the container 10 is sealed with a lid 99 which is secured to the sidewalls 13 of the container 10 with top frame 95 and straps 97.

From the foregoing detailed descriptions, it will be observed that numerous variations and modifications may be effected without departing from the true spirit and scope of the novel concept of the invention. It is to be understood that no limitation with respect to the specific apparatus or method illustrated herein is intended or should be inferred. It is, of course, intended to cover by the appended claims all such modifications as fall within the scope of the claims.

I claim:

1. An apparatus for manufacturing cheese blocks from cheese curd particles containing whey comprising: a container having two open ends for holding said curd particles, said container adapted to be initially oriented in an upright position with said open ends being at the top and bottom of said container and being defined by sidewalls of said container; receiver means enclosing said bottom open end of said container, said receiver means having perforations for receiving draining whey from said curd particles; conduit means including two spaced apart generally parallel foraminous sidewalls defining a space therebetween, said space being communicating with the perforations in said receiver means, said foraminous sidewalls being of substantially parallel construction throughout their extent in the container and being of sufficient width and height in relation to the container such that the whey has a relatively short distance to travel to said sidewalls and thus is easily drainable over substantially the entire volume of said cheese curd, whereby said conduit means defines a path to allow a quantity of said whey to flow out of said container into said receiver means when pressure is applied to said curd particles.

2. An apparatus in accordance with claim 1 wherein said receiver means comprises a drain plate including a planar wall having a plurality of spaced perforations aligned with said space.

3. An apparatus in accordance with claim 1 wherein said sidewalls of said conduit means have circular openings, the openings being generally uniformly distributed in rows substantially throughout said sidewalls.

4. An apparatus in accordance with claim 1 wherein said sidewalls have a bottom edge abutting against said receiver means, and wherein said sidewalls straddle and enclose said perforations of said receiver means, whereby said draining whey from said conduit means passes through said perforations of said receiver means.

5. An apparatus in accordance with claim 1 wherein said conduit means includes a press drain cloth formed of a porous material covering the outermost surfaces of said sidewalls of said conduit means and being in direct contact with the curd particles, said press drain cloth permitting the passage of said whey to said conduit means while maintaining said curd particles in said container.

6. An apparatus in accordance with claim 5 including means for positioning said press drain cloth adjacent to the outer surfaces of said conduit means.

7. An apparatus in according with claim 1 wherein said foraminous sidewalls of said conduit means are spaced inwardly from adjacent sidewalls of said container.

8. An apparatus in accordance with claim 1 including a means for supporting and centering the conduit means in generally normal position relative to and on said receiver means.

9. An apparatus in accordance with claim 8 wherein said means for supporting and centering includes a multiplicity of legs extending outwardly from the bottom portion of said conduit means and generally parallel with and resting on said receiver means when said conduit means is placed within said container.

10. An apparatus in accordance with claim 8 wherein said means for supporting and centering comprises two rods with pin means on one end of each rod, each rod extending outwardly from one end wall of said conduit means adjacent the bottom edge of said conduit means, said rods being generally parallel to and resting on said receiver means when said conduit means is within said container, said receiver means having a pair of apertures, each aperture being spaced outwardly of one end wall of said conduit means, each pin means on each said rod extending in a direction normal to its said rod and in a downward direction and into one of said apertures.

11. An apparatus in accordance with claim 8 wherein said means for supporting and centering includes at least a pair of tabs on said receiver means facing the interior of said container, each tab embracing the outside surface of one of said sidewalls of said conduit means, when said conduit means is placed over said perforations of said receiver means.

12. An apparatus in accordance with claim 11 wherein said means for supporting and centering includes at least a further pair of tabs on said receiver means facing the interior of said container, each tab embracing the outside ends of said conduit means, when said conduit means is placed over said perforations of said receiver means.

13. An apparatus in accordance with claim 1, further including a filler ring including a collar conforming to the outer configuration of the upper end of the container, said collar being removably mounted on the upper end of said container to prevent spillage of said curd particles while said curd particles are placed within said container.

14. An apparatus in accordance with claim 1, further including means for holding said conduit means in a generally vertical position during filling of said container with said curd particles, said holding means extending down into the upper end of said container and engaging said conduit means, said holding means being removable once sufficient curd particles are placed into said container to support and maintain said conduit means vertical posture.

15. An apparatus in accordance with claim 1 said receiver means including a base receptacle adapted to collect the whey discharged from said receiver means, said base being removable from said container.

16. An apparatus for manufacturing cheese blocks from cheese curd particles containing whey, comprising: an open ended container for holding said curd particles, said container adapted to be initially oriented in an upright position with open ends being at the top and bottom of said container and being defined by the walls of said container, a drain plate extending across the bottom end of said container and defining a row of spaced apertures, drain device means occupying a substantial vertical cross section of said container and being supported on said drain plate when positioned within said container to enclose said apertures of said drain plate, said drain device means including two fixed foraminous sidewalls that are of substantially parallel construction throughout their extent in the container and being of sufficient width and height in relation to the container such that the whey has a relatively short distance to travel to said sidewalls and thus is easily drainable over substantially the entire volume of said cheese curd, whereby said drain device means defines a path to allow a quantity of said whey to pass down said drain device means and out of said container through said apertures of said drain plate when pressure is applied to said curd particles, said pressure then being removed and said container invertable with the drain plate and said drain device means being removable from said container so that pressure can be applied to said curd particles to thereby produce a substantially homogeneously knitted curd providing a uniformly textured block of cheese.

17. An apparatus in accordance with claim 16 wherein said drain device means includes a multiplicity of tabs attaching said drain device means sidewalls to each other, thereby maintaining the fixed, spaced apart and generally parallel orientation of said drain screen sidewalls.

18. An apparatus in accordance with claim 16 wherein said drain device means comprises a single foraminous plate bent substantially to define two sidewalls.

19. An apparatus in accordance with claim 18 wherein said drain device means includes a multiplicity of tabs attaching said sidewalls to each other and spacing blocks to maintain the fixed, spaced apart and generally parallel orientation of said sidewalls.

20. An apparatus in accordance with claim 16 wherein said drain device means comprises two foraminous plates, a first of said plates having two opposing ends bent over to form a U-shaped channel at said opposing ends of said first plate and the second of said plates being configured to allow said second plate to slide into and be secured by said channels of said first plate, wherein said first and second plates define said foraminous sidewalls, wherein orienting said drain device means thereby allows said bent ends of said first plate to face the walls of said container.

21. An apparatus in accordance with claim 20 including spacing blocks welded to said first plate for maintaining said plates of said drain device means in spaced apart relation.

22. An apparatus for manufacturing cheese blocks from cheese curd particles containing whey, said apparatus including an open ended container for receiving said curd particles, said container including four wall members, said wall members comprising two pairs of two opposing parallel wall members, said container adapted initially to be oriented in an upright position with said open ends being at the top and bottom of said container, a drain plate enclosing said bottom end of said container including a row of plurality of openings located along a major central axis of said drain plate, a stainless steel drain screen including two sidewalls substantially parallel, spaced apart and fixed, said sidewalls being perforated, said perforations being in rows distributed uniformly in the entire said sidewalls, said sidewalls being spaced inwardly from adjacent said wall members of said container, a drain cloth envelope formed of a porous material covering the outermost surfaces of said drain screen sidewalls permitting the passage of said whey through to said drain screen, said drain screen sidewalls being positioned in said container embracing and being normal to said drain plate and extending to the top of said container, said drain screen sidewalls are positioned on said drain plate whereby, said drain screen sidewalls straddle said row of openings of said drain plate, thereby, permitting, while applying pressure through the top open end of said container to said curd particles, said whey being forced by said pressure from said curd particles to flow through said drain cloth envelope and to drain through said perforations of said drain screen and down through said openings of said drain plate whereby, a substantial amount of said whey is extracted from said container, subsequently removing said pressure and inverting said container extracting said drain plate and drain screen now from the top of said container and reapplying pressure through the top of said container whereby, closing residual voids in the curd material thereby completing a fusion of said curd particles providing a substantially homogeneously solid block of cheese.

23. An apparatus for manufacturing cheese blocks from cheese curd particles containing whey comprising: a container having two open ends for holding said curd particles, said container adapted to be initially oriented in an upright position with said open ends being at the top and bottom of said container and being defined by sidewalls of said container; receiver means enclosing said bottom open end of said container, said receiver means having perforations for receiving draining whey from said curd particles; conduit means including two spaced apart generally parallel foraminous sidewalls defining a space therebetween, said space being communicating with the perforations in said receiver means, said foraminous sidewalls being of substantially parallel construction throughout their extent in the container and being of sufficient width and height in relation to the container such that the whey has a relatively short distance to travel to said sidewalls and thus is easily drainable over substantially the entire volume of said cheese curd, whereby said conduit means defines a path to allow a quantity of said whey to flow out of said container into said receiver means when pressure is applied to said curd particles, said conduit means including a press drain cloth formed of a porous material covering the outermost surfaces of said sidewalls of said conduit means and being in direct contact with the curd particles, said press drain cloth permitting the passage of said whey to said conduit means while maintaining said curd particles in said container, and means for positioning said press drain cloth adjacent to the outer surfaces of said conduit means, said press drain cloth including a pocket at one end thereof, and said positioning means including a bar attached to said conduit means, said bar being parallel with the upper edge of said conduit means and extending through the pocket in said press drain cloth.

* * * * *